E. C. SMITH.
FINGER BAR ALINING MECHANISM.
APPLICATION FILED JAN. 27, 1913.
1,146,968.
Patented July 20, 1915.
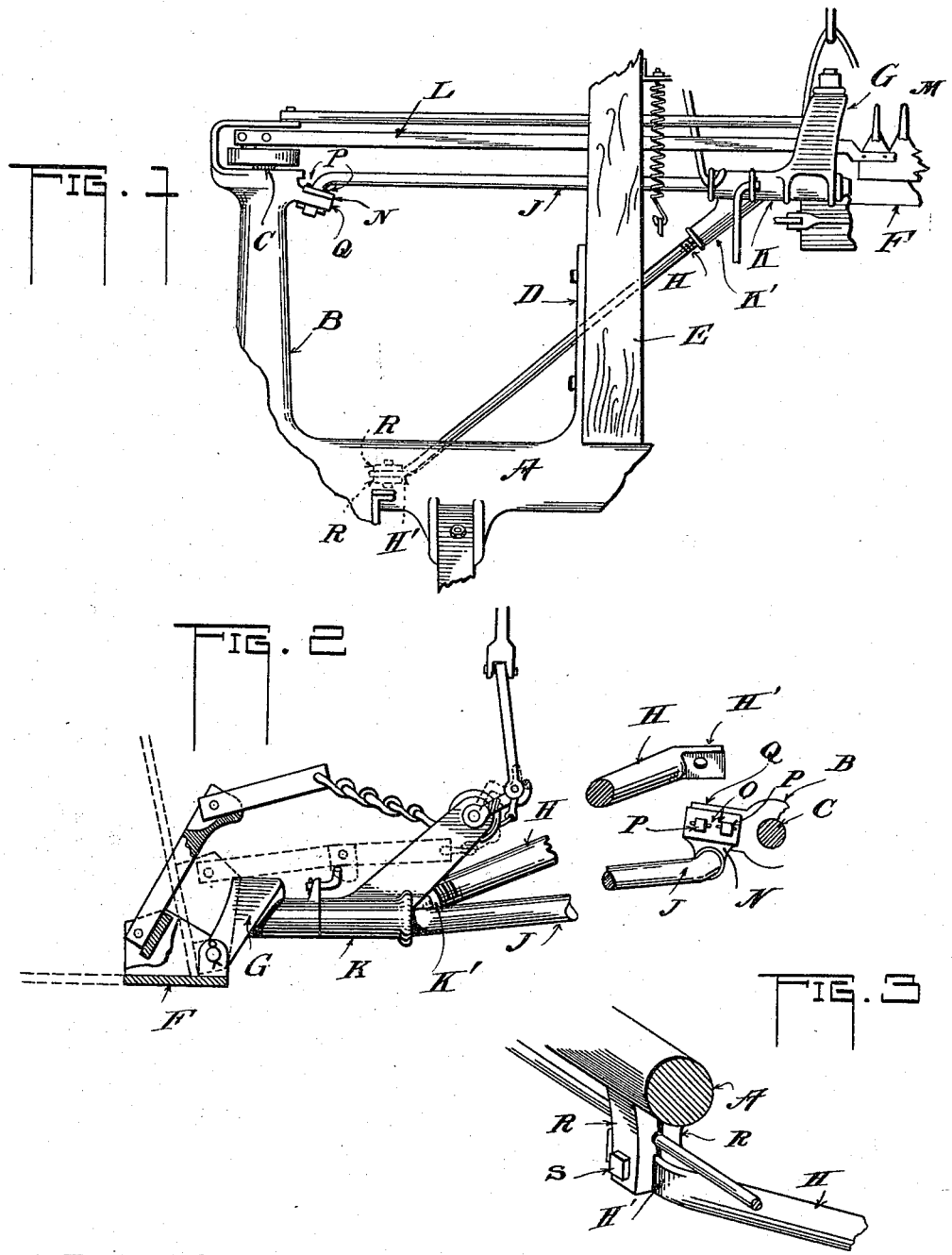
WITNESSES
INVENTOR
Ernest C. Smith,
BY
ATT'Y.

UNITED STATES PATENT OFFICE.

ERNEST C. SMITH, OF PEORIA, ILLINOIS, ASSIGNOR TO ACME HARVESTING MACHINE CO., OF PEORIA, ILLINOIS, A CORPORATION OF WEST VIRGINIA.

FINGER-BAR-ALINING MECHANISM.

1,146,968.  Specification of Letters Patent.  Patented July 20, 1915.

Original application filed October 31, 1912, Serial No. 728,908. Divided and this application filed January 27, 1913. Serial No. 744,276.

*To all whom it may concern:*

Be it known that I, ERNEST C. SMITH, a citizen of the United States, residing at Peoria, in the county of Peoria and State of Illinois, have invented certain new and useful Improvements in Finger-Bar-Alining Mechanism; and I do hereby declare that the following is a full, clear, and exact description of the invention, which will enable others skilled in the art to which it appertains to make and use the same.

This invention relates to improvements in mowing machines and relates particularly to mechanism in a mower for alining the finger-bar to cause the sickle-bar to be brought into proper line with the driving pitman, also to means for "timing" the sickle by a longitudinal adjustment of the said finger-bar relatively to said sickle.

The object of the invention is to provide a new and novel structure in a mower for timing the sickle and alining the finger-bar and one that will be simple in its structure and distinguished from other forms of structure by the ease and positiveness of its adjustment.

Another object is to provide for a combination of movements above described.

This application is divided from a parent application for a mower filed by me in the United States Patent Office on the 31st day of October 1912, bearing Serial No. 728,908.

In order to make the invention fully understood I have provided the accompanying drawing in which, Figure 1 is a plan of a portion of a mower frame together with a part of the finger-bar and sickle and my invention shown in connection therewith. Fig. 2 is a front elevation of part of a finger-bar and parts of my invention in connection therewith. Fig. 3 is a detail of the axle of the mower-frame in perspective showing depending members to which a push bar is secured for adjusting the finger-bar.

In Fig. 1 the mower frame is indicated at A. Extending forward from the same is any usual cast housing B for a shaft C that drives the sickle. D is also a forward extension of the casting A to which the tongue E is bolted.

A part of the finger-bar is represented at F. It is carried pivotally in any usual way by a yoke G pivotally supported from the frame of the mower through a push bar H and a drag bar or coupling bar J, that is to say, both the latter members are pivotally hung from the mower frame in a manner now to be described. Carried by the said yoke G is a part K which receives one end of the drag-bar J, the other end of the latter extending toward the extension B of the mower-frame. It lies substantially parallel to the pitman L which is connected in any usual manner with the usual sickle M. The said drag-bar is secured in the said extension K in any desired manner while its other end is pivotally hung in a plate N provided with slots O, for example, which receive bolts P that extend through a projection Q of the mower-frame-extension B. The said bar is pivotally held in any suitable manner in said plate N and by loosening the bolts the plate and bar can be shifted in a longitudinal direction with regard to the said drag bar.

For timing the sickle it is necessary to shift the finger-bar relatively to it so as to bring its fingers in proper position with relation to the teeth of said sickle, this being required in practice in order to produce the best results. It is to be observed that through the ease of adjustment of the drag-bar longitudinally through the means described the timing can be readily and quickly accomplished. An extension K' of the part K extends rearwardly at an angle and receives the threaded end of the push-bar H before referred to. The other or rear end of the latter is preferably flattened as at H' in Fig. 2 and is held between a pair of depending lugs R on the under side of the mower frame A. A bolt S extending through the bar and the said lugs R serves as a pivot upon which said bar can swing.

In order to aline the finger-bar or to carry its outer end in the proper direction to bring it and the sickle into proper alinement with the pitman L it is only necessary to remove the bolt S and rotate the push-bar H in the proper direction on its threads to such an extent that when the bar is again secured by the bolt S the said finger-bar will have been brought to its proper position. The adjustment of the push bar in the extension K' results in a change in the distance between the bolt S and the extension so that in the reattachment of the push-bar by means of said bolt the required alinement will have resulted.

My structure differs from those of which I am aware in that the drag-bar and push-bar are both adjustable whereas heretofore but one of said bars has been arranged for adjustment. It is found necessary to provide both of the adjustments mentioned, however, in order to get the desired results. This is due to the fact that in alining the sickle-bar through the change in distance between the places of attachment of the push-bar on the frame and yoke the relative positions of the teeth of the sickle-bar and the guards on the sickle-bar are changed. In consequence the best results are not obtainable from the machine in grass cutting. It is evident, therefore, that the adjustment of but one of the bars is not sufficient but that both must be adjusted. In lifting the finger-bar by any of the usual means to carry its inner end at the yoke G above obstructions, or in lifting the entire finger-bar for transportation purposes, the whole structure described swings by means of the drag-bar J and the said push-bar H upon their respective pivots, that is to say, the plate N and the said bolt S.

The structure described and shown provides a very simple as well as a very effective means for obtaining the two adjustments, and but a moment or two is required for them. Preferably both the bars H and J are adjusted at the same time thus alining the finger-bar and timing the sickle at one operation.

The structure described may be changed slightly as may be suggested to a skilled person since I do not wish to be confined necessarily to the exact form shown.

Having thus described my invention, I claim:—

1. In a mower, the combination with its main frame, a yoke and sickle-bar, of a push bar connected to the frame and to said yoke and adjustable relative to one of them, the same extending at an angle rearwardly toward the stubbleward side of the machine, a drag-bar secured at one end in the yoke and pivoted relative to the frame at its other end but otherwise secured relative thereto, said bar being adjustable relative to one of the parts to which it is attached, and means to adjustably secure it to that part.

2. In a mower, the combination with its main frame, a yoke and sickle-bar, of a push-bar connected to the frame and yoke and adjustable relative to one of them and extending at an angle rearwardly toward the stubbleward side of the machine, a drag-bar secured to the yoke and adjustable relative to the main frame and lying substantially parallel to the plane in which the sickle-bar lies, and means adjustably secured on the frame to which said drag-bar is pivoted, said drag-bar and said push-bar both being pivoted relative to the frame.

3. The combination of a main frame, a yoke, a push-bar attached at one end to the yoke and extending rearwardly at an angle in the direction of the stubbleward side of the main frame and secured at its end in a pivotal manner to said frame and adapted for adjustment within the yoke when detached from said main frame, a drag-bar, or coupling-bar, secured at one end to the yoke, a member mounted on the main frame and adjustable in a lateral direction and having the coupling-bar attached thereto, and means to secure the member to the said main frame.

4. The combination of a main frame, a yoke, a push-bar attached at one end to the yoke and adjustable relative thereto, and extending at an angle rearwardly from the said yoke in the direction of the stubbleward side of the frame and pivotally carried in the frame, a coupling-bar secured in the yoke and also extending in the direction of the stubbleward side of the frame, a member in which that end of the coupling-bar is mounted, and means to secure the member adjustably on the frame.

5. The combination of a main frame, a yoke, a push-bar attached at one end to the yoke and extending at an angle rearwardly from the said yoke in the direction of the stubbleward side of the frame and pivoted to the latter and adapted when uncoupled from the latter to be turned on its axis for adjusting it relatively to the yoke, a coupling-bar secured to the yoke and movable relatively to the frame, and means adjustably secured to the said main frame in which the said coupling-bar is pivoted.

In testimony whereof I affix my signature, in presence of two witnesses.

ERNEST C. SMITH.

Witnesses:
EUNICE BECKUM,
L. M. THURLOW.

Copies of this patent may be obtained for five cents each, by addressing the "Commissioner of Patents, Washington, D. C."